United States Patent [19]

Leigh-Monstevens et al.

[11] Patent Number: 5,716,081

[45] Date of Patent: Feb. 10, 1998

[54] SPRING CLIP FOR QUICK CONNECT COUPLING

[75] Inventors: Keith V. Leigh-Monstevens, Rochester Hills; James V. Ludwig, Jr., Shelby Township, both of Mich.

[73] Assignee: Automotive Products (USA), Inc., Auburn Hills, Mich.

[21] Appl. No.: 614,007

[22] Filed: Mar. 11, 1996

[51] Int. Cl.[6] .................................................. F16L 39/00
[52] U.S. Cl. ...................................... 285/319; 137/614.03
[58] Field of Search .............................. 285/319, 321, 285/921; 137/614.03

[56] References Cited

U.S. PATENT DOCUMENTS

| | | | |
|---|---|---|---|
| 4,032,178 | 6/1977 | Neuroth | 285/319 |
| 4,270,777 | 6/1981 | Fisher | 285/319 |
| 4,637,640 | 1/1987 | Fournier et al. | 285/319 |
| 4,647,082 | 3/1987 | Fournier et al. | 285/315 |
| 4,749,214 | 6/1988 | Hoskins | 285/319 |
| 4,875,709 | 10/1989 | Caroll et al. | 285/319 |
| 4,902,043 | 2/1990 | Zillig et al. | 285/319 |
| 4,936,345 | 6/1990 | Nix | 137/614.03 |
| 4,951,975 | 8/1990 | Bartholomew | 285/319 |
| 4,991,627 | 2/1991 | Nix | 137/614.03 |
| 5,083,433 | 1/1992 | Leigh-Monstevens | 60/585 |
| 5,171,164 | 12/1992 | O'Neil | 285/319 |
| 5,248,168 | 9/1993 | Chichester | 285/319 |
| 5,249,830 | 10/1993 | Calmettes et al. | 285/319 |

FOREIGN PATENT DOCUMENTS 2236567  10/1991  United Kingdom.

*Primary Examiner*—Eric K. Nicholson
*Attorney, Agent, or Firm*—Young & Basile, P.C.

[57] ABSTRACT

An improved quick connect coupling and an improved spring clip for use in the coupling. The coupling comprises a female member defining a passage defining an annular seat, a male member sized to fit in the passage, and a spring clip positioned in the annular seat. The spring clip comprises a thin walled spring steel tubular member capable of being compressed for seating within the annular seat and including a first plurality of circumferentially spaced finger portions for engagement with a trailing abutment surface on the male member and a second plurality of circumferentially spaced finger portions for engagement with an annular shoulder defining one end of the annular seat. In one embodiment the finger portions for engagement with the abutment surface on the male member have a T configuration with the head portions of the fingers coacting to define a large circumferential surface for engagement with the male member abutment surface. In another embodiment the finger portions for engagement with the annular shoulder on the female member have a T configuration with the T portions of the fingers coacting to define a large circumferential surface for engagement with the annular shoulder.

6 Claims, 3 Drawing Sheets

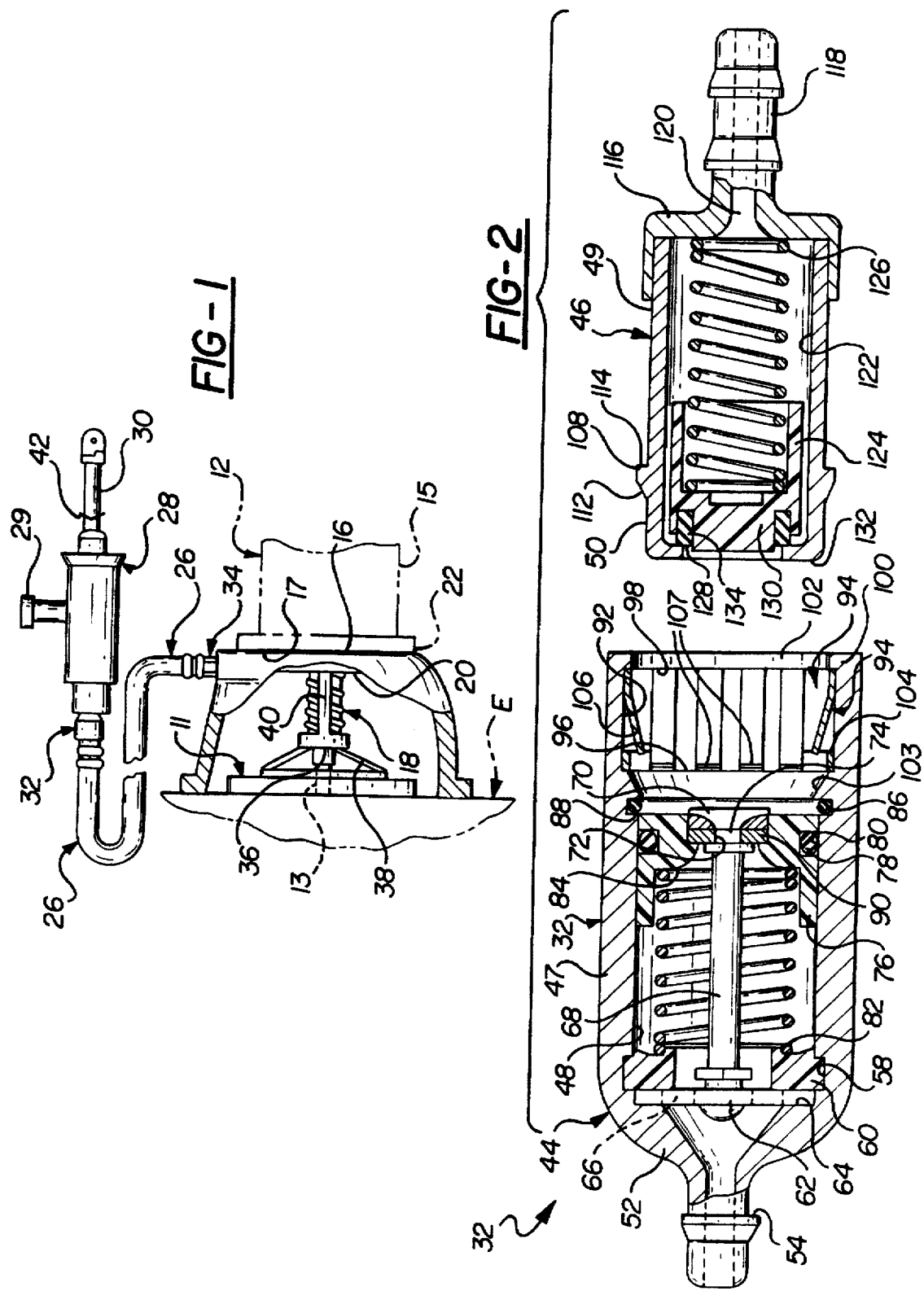

SPRING CLIP FOR QUICK CONNECT COUPLING

BACKGROUND OF THE INVENTION

This invention relates to a quick connect coupling and more particularly to an improved spring clip for use in a quick connect coupling.

Quick connect couplings typically comprise two primary components or parts interconnectable in a sealed relationship to permit the flow of fluid therebetween. A wide variety of latching devices have been used to interconnect the parts or halves of the coupling to maintain the couplings in their sealed, interconnected relationship. Typically, the coupling includes a female member adapted to sealingly receive a male member therein wherein relative axial displacement of the parts permits interconnection of the parts with the connection being maintained by a suitable latch structure.

One popular type of axial displacement coupling utilizes a spring clip having resilient fingers positioned in the female part which engage with a shoulder formed on the male part upon the parts achieving a coupled relationship. The resilient fingers are initially displaced radially outwardly by the male part shoulder as the male part is inserted into the female part and, after the fingers ride over the shoulder, they snap into axial alignment behind the shoulder to prevent withdrawal of the male part.

Whereas the prior art spring clips have been generally satisfactory, there are applications where it is important to maximize the circumferential surface presented by the spring clip for engagement with a coacting surface on the male or female member.

SUMMARY OF THE INVENTION

This invention is directed to the provision of an improved quick connect coupling.

More specifically, this invention is directed to the provision of a quick connect coupling having an improved spring clip.

The quick connect coupling includes a male member having an axially extending body portion and a female member defining an axially extending bore sized to receive the body portion. The female member includes resilient means and the male member includes leading camming means operative in response to insertion of the male member body portion into the female member bore to bias the resilient means radially outwardly. The male member further includes trailing abutment means operative in response to movement of the leading camming means past the resilient means to coact with the resilient means to inhibit withdrawal of the male member from the female member bore.

The resilient means comprises a tubular spring clip formed as a relatively thin walled spring steel tubular member or ring capable of being compressed for fitting within an annular seat in the female member bore and allowed to expand elastically toward its original diameter so as to be held resiliently in the annular seat within the bore. The clip includes a first plurality of circumferentially spaced finger portions for engagement with the trailing abutment means on the male member to inhibit withdrawal of the male member and further includes a second plurality of circumferentially spaced finger portions adapted to engage an annular shoulder defining one end of the annular seat of the female member so as to preclude axial movement of the clip within the female member.

According to the invention, one of the sets of fingers has a T-configuration with the head of each T-shaped finger extending circumferentially and the stem of the finger extending axially. The sum of the circumferential expanses of the head portions of the fingers provides a large circumferential surface for engagement with a coacting surface on the male or female member. In one disclosed embodiment the T-shaped fingers define a circumferential surface for engagement with the annular shoulder of the female member defining the annular seat and in another embodiment the T-shaped fingers define a circumferential surface for engagement with the trailing abutment means on the male member.

BRIEF DESCRIPTION OF THE DRAWINGS

FIG. 1 is a schematic representation of a clutch hydraulic control apparatus;

FIGS. 2 is a longitudinal section showing the two separated halves of a leak-proof quick-connect fitting or connector employed in the clutch hydraulic control apparatus and employing a spring retainer clip according to the invention;

DETAILED DESCRIPTION OF THE PREFERRED EMBODIMENT

Figure 3:
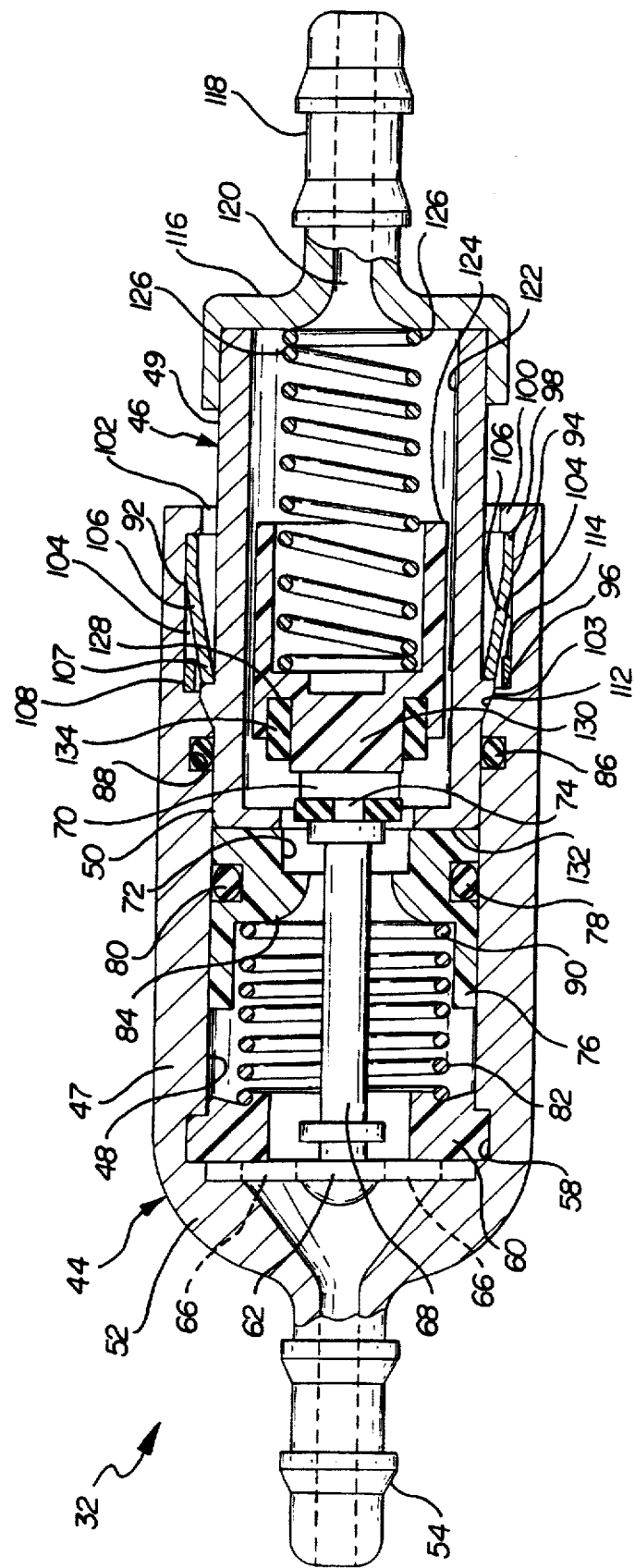
FIG. 3 is a view similar to FIG. 2 and showing the connector halves coupled together.

Referring to the drawings, and more particularly to FIG. 1, a motor vehicle transmission is schematically illustrated as comprising a friction clutch assembly and a gearbox 12 enclosed in a casing or housing 15. A drive shaft 13 drives the gearbox 12 from the clutch assembly 11. A bell housing 14, surrounding the clutch assembly 11, is bolted on the rear face of the motor vehicle engine E. The rear face 16 of the bell housing 14 is bolted to the face 17 of the gearbox casing 15. An annular hydraulic slave cylinder 18 is disposed around the drive shaft within the bell housing 14. Slave cylinder 18 has a one-piece housing 20 cast integral with the clutch bell housing 14. The face 17 of the gearbox casing 20 is on a flange 22, and an end plate, not shown, closing the end of the gearbox casing 15, is also bolted to the face 17 of the gearbox casing 15, the transmission input shaft as shown in dash lines, projecting through the end plate 24.

Slave cylinder 18 is connected via a line or conduit 26 to a master cylinder 28. Master cylinder 28 includes a hydraulic fluid reservoir 29 and has an input rod 30 pivotally connectable at an end to a clutch control pedal, not shown, installed within the driver compartment of a motor vehicle, not shown. Rod 30 is connected to a piston, not shown, disposed in master cylinder 28 for displacing hydraulic fluid through the line 26 to slave cylinder 18 when the clutch pedal is depressed. Conduit 26 is a flexible conduit or hose having a connector 34 on its one end for connection to the inlet of slave cylinder 18 and a connector 32 on its other end for connection to the outlet of master cylinder 28.

Slave cylinder 18 is adapted to displace a throwout bearing 36 engaged with the end of clutch release fingers 38, for releasing the clutch when hydraulic fluid is introduced into the slave cylinder 18 from master cylinder 28 through the conduit 26.

Fitting or connector 32, connecting the one end of conduit 26 to master cylinder 28, is of the leak-proof quick-connect type, while fitting or connector 34, connecting the other end of conduit 26 to slave cylinder 18, is of the conventional type.

As illustrated in detail in FIGS. 2 and 3, the leak-proof quick-connect connector 32 consists of two complementary interchangeable half-connectors or members 44 and 46, each formed of a tubular body 47 and 49, respectively. Half-connector 44 is of the female type and its tubular body 47 has a bore 48 capable of slidably accepting the cylindrical peripheral surface 50 of the tubular body 49 of the male connector member, 46. FIG. 3 illustrates female and male members 44 and 46 coupled, as also shown at FIG. 1, while FIG. 2 illustrates female member 44 and male member 46 uncoupled prior to introducing the tubular body 49 of male member 46 into bore 48 of female member 44, after installation of master cylinder 28 and of slave cylinder 18 and clutch bell housing 14 sub-assembly in their respective locations on a motor vehicle.

Tubular body 47 of female member 44 is formed of a single piece casting or forging of aluminum provided at one end with an integral tapered portion defining an end cap 52 terminating in an integral outwardly projecting fitting 54, a passageway 56 providing fluid communication with the interior of a conduit, such as the conduit 26 (FIG. 1) having its end fitted over fitting 54 and being adequately clamped thereon. Bore 48 of tubular body 47 has an enlarged diameter portion 58, at its end provided with the end cap 52, in which is fitted an elastic plastic retainer ring 60 holding a metallic disk 62 against a shoulder 64 at the end of bore 48. Disk 62 is perforated by a plurality of apertures 66 providing fluid communication between passageway 56, and therefore conduit 26, and the interior or bore 48 of tubular body 47. A rod or stem 78 is fixedly mounted at the center of disk 62 and extends longitudinally and axially in bore 48. Rod 68 has an enlarged head 70 at its end provided with a groove 72 in which is disposed an annular seal 74 made of elastomeric material.

A sleeve 76 is slidably disposed in bore 48. Sleeve 76 has a peripheral groove 78 in which is disposed an elastomeric sealing ring 80. A coil spring 82 disposed between retainer ring 60 and an annular abutment surface 84 of the sleeve 76 urges sleeve 76 outwardly against or in close proximity with, an elastomeric O-ring 86 disposed in an internal groove 88 close to the open end of tubular body 47. Sleeve 76 has an end port in the form of a bore 89 that slidably fits about the enlarged head 70 at the end of rod 68, bore 89 having a reduced diameter portion forming an annular abutment 90 which, in the uncoupled position of FIG. 2, limits the outward displacement of sleeve 76 and engages elastomeric annular seal 74 in groove 72 of enlarged head 70 of rod 68, such that with hydraulic fluid in bore 48 of tubular member 47, behind sleeve 76, the fluid is contained in bore 48 without leakage to the ambient. The open end of the female member tubular body 47, beyond the O-ring 86, is provided with an enlarged diameter bore or seat portion 92 in which is disposed resilient means in the form of a spring retainer clip 94.

Retainer clip 94 is positioned between rear and front annular shoulder abutments or walls 96 and 98 defined at the rear and front boundaries respectively of enlarged diameter portion 92 of bore 48. Front annular shoulder abutment 98 is defined by the inner surface of an inwardly directed flange 100 ending in a cylindrical surface 102. Rear annular shoulder abutment 96 is defined at the front boundary of a frusto-conical surface 103 disposed between groove 88, in which is disposed O-ring 86, and enlarged diameter bore portion 92.

Retainer clip 94 is made of a relatively thin-walled spring steel tubular member which is split or slit as seen at 105 such that the clip can be compressed for fitting within the enlarged bore portion 92 between the shoulder abutments 96 and 98 and allowed to expand elastically toward its original diameter. Clip 94 has an overall axial extent slightly less than the axial extent of bore portion 92 so that the clip may fit snugly against bore portion 92 with forward or rearward axial movement of the clip precluded by shoulders 98 and 96.

Clip 94 includes a front annular wall 94a which is continuous except for the slit 105; a first set of circumferentially spaced fingers 94b extending rearwardly from wall 94a and a second set of circumferentially spaced fingers 94c extending rearwardly from wall 94a. The fingers 94b and 94c alternate so that each finger 94c is positioned between successive fingers 94b.

Each finger 94b has a T-configuration including an axially extending stem portion 94b and an arcuate circumferentially extending bar portion 94e. The bar portions 94e are sized such that each bar portion 94e is separated from the next adjacent bar portion 94e by a relatively narrow slit 106 so that the successive bar portions 94e coact to define a circumferential surface that is substantially continuous except for the slits 106 and the slit 105. Fingers 94b lie in the same cylindrical plane as wall 94a.

Fingers 94c extend rearwardly from wall 94a and are deformed radially inwardly from the cylindrical plane of wall 94a and fingers 94b to present rear edges 94f. When fitted into the enlarged diameter portion 92 of the bore 48 of the female member, the bar portions 94e of the fingers 94b engage rear annular shoulder 96, the front edge 94g of front annular wall 94a engages front shoulder 98, and the fingers 94c extend radially inwardly into bore 48 for coaction with the male connector 46.

Male connector member 46 of the connector 32 has a tubular body 49 having a peripheral surface 50 of a diameter permitting a slidable fit in bore 48 of female connector member 44. The periphery 50 of male member tubular body 49 is provided with an outwardly extending annular ridge or bead 108 of an outer diameter allowing passage of the tip of the ridge 108 within the cylindrical surface 102 of the flange 100 at the tip of tubular body 47 of the female member 44. The forward side of ridge 108 defines leading camming means in the form of a ramp 112 which, when male member 46 is introduced into female member 44, causes, together with the nose or tip of the male member, progressive elastic deflection of retainer clip fingers 94c until fingers 94c elastically snap back substantially to their original position with end face 94f of each finger 94c engaging trailing abutment means in the form of a radial annular shoulder 114 formed on the other side of annular ridge 108. Further introduction of male member 46 into female member 44 is prevented by ramp 112 engaging frusto-conical surface 103 in female member 44.

Male member tubular body 46 is closed at one extreme end by an end cap 116 screwed on, welded, soldered or brazed in position over that end of tubular body 49. End cap 116 is provided with a fitting 118 for connection to an appropriate conduit, a passageway 120 placing the interior of the conduit in fluid communication with the bore 122 within female member tubular body 48. A cylindrical, generally cup-shaped, valve member 124 is slidably disposed within bore 122 and is urged by a coil spring 126, having an end abutting end cap 116 and the other end engaged against an annular abutment 128 within the valve member 124, to the position shown at FIG. 2 when the female and male members 44 and 46 are uncoupled.

Valve member 124 has a solid cylindrical end portion 130 of a diameter adapted to fit within a retaining end flange 132 formed at the open end of tubular body 49. An annular elastomeric ring 134 is disposed around the solid cylindrical end portion 130 of valve member 124 and prevents leakage of fluid from bore 122 in the male member body 49 to the ambient, when the connector members are uncoupled, in view of the action of the coil spring firm firmly engaging elastomeric seal 134 against the inner surface of end retaining flange 132. Valve member 124 is provided on its periphery with longitudinal grooves 136 which provide fluid communication between bore 122 of male member 46 and bore 48 of female member 44 when valve member 124 is displaced, against the biasing action of coil spring 126, to the position shown in FIG. 3, by the end of enlarged head portion 70 at the end of rod 68 in female member 44, during the coupling of female member 44 and male member 46. Simultaneously during coupling, the end of male member tubular body 49, that is provided with flange 132, retracts sleeve 76 in the female member bore 48 against the biasing action of coil spring 82 such that sleeve annular abutment 90 no longer engages annular seal 74 at enlarged head 70 of rod 68 and bore or port 48 is open to hydraulic fluid flow. When coupled together, as shown in FIG. 3, female member 44 and male member 46 provide an uninterrupted free passage for the flow of hydraulic fluid between bore 48 of female member 44 and bore 122 of male member 46. This passage is leak-proof to the ambient as a result of periphery 50 of tubular body 49 of male member 46 being engaged with and compressing O-ring 86 in the internal groove 88 of female member 44. After the connector members are securely coupled, FIG. 3, the end face 94f of each flexible finger 94c of the retainer clip 94 engages the annular abutment 114 of the ridge 108 about the periphery of male member tubular body 49 whereby separation of the two connector members is prevented.

Figure 5:
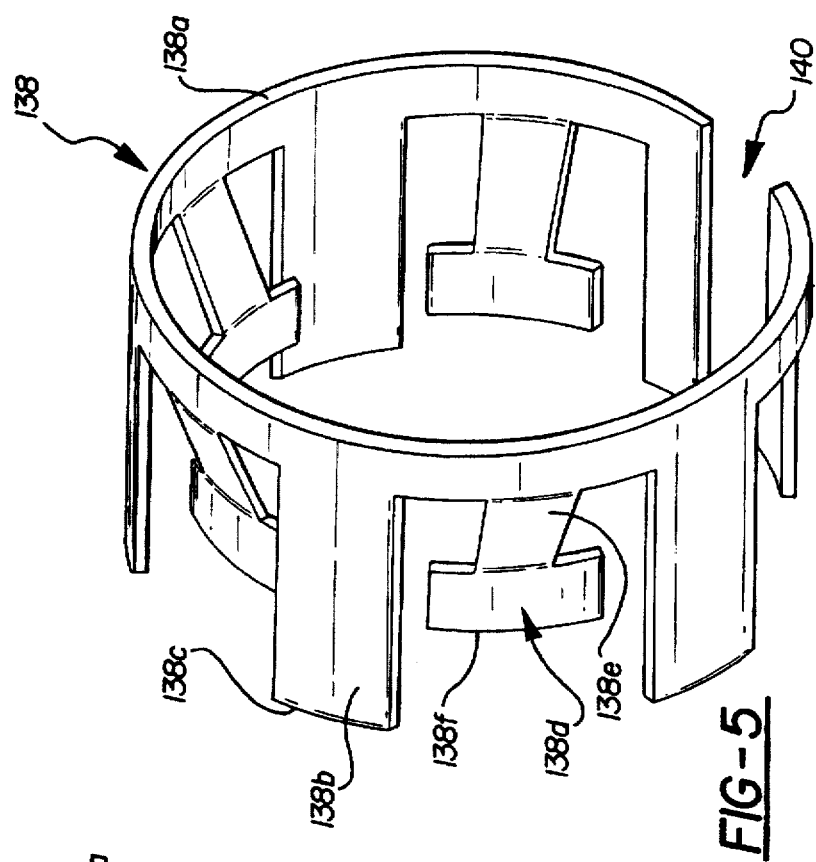
FIG. 5 is a perspective view of a modified form of spring retainer clip.
Figure 4:
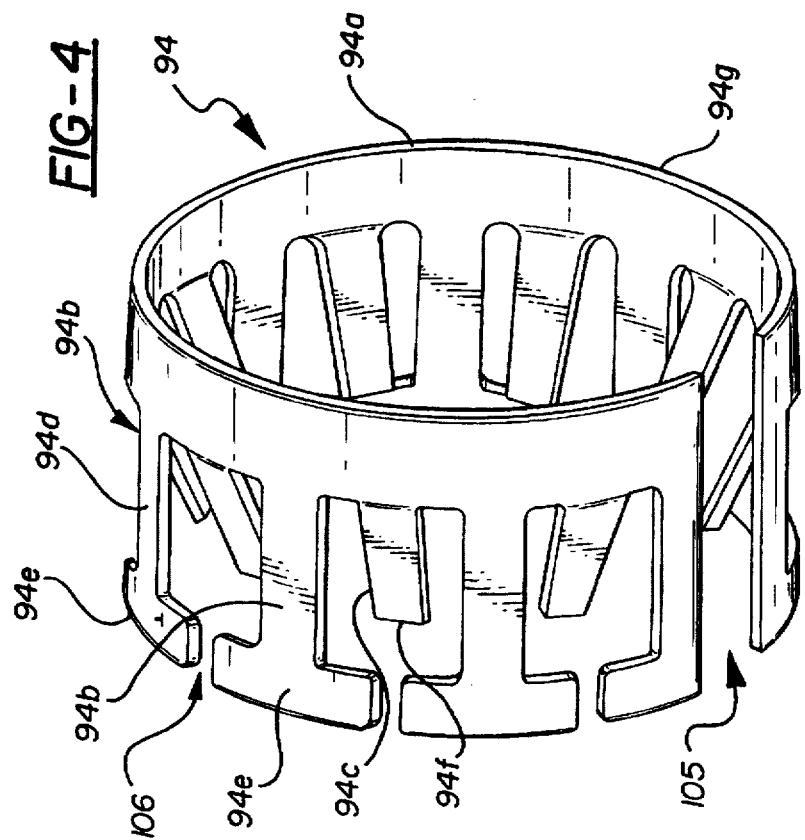
FIG. 4 is a perspective view of a spring retainer clip according to the invention.

The modified form of spring clip 138 seen in FIG. 5 is also formed of a relatively thin-walled spring steel tubular member which is split or slit at 140 so that the clip can be compressed for fitting within the enlarged bore portion 92 at the end of the female member tubular body 47 between shoulder abutments 96 and 98 and allowed to expand elastically toward its original diameter.

Clip 138 includes an annular front wall portion 138a which is continuous except for split 140 and which seats against front shoulder 98; a series of circumferentially spaced finger portions 138b extending rearwardly from front wall 138a and terminating in rear edges 138c for engagement with rear shoulder 96; and a series of circumferentially spaced finger portions 138d extending rearwardly from front wall 138a in staggered or alternating relation with respect to fingers 138c so that a finger 138d is positioned between each adjacent set of fingers 138c.

Each finger 138d has a T-shaped configuration and includes a stem portion 138e extending rearwardly from ring 138a and an arcuate bar portion 138f extending circumferentially. Each stem portion 138e is deformed so as to angle rearwardly and inwardly with respect to the cylindrical plane of the clip to dispose the bar portions 138f radially inwardly with respect to the cylindrical plane of the clip. Bar portions 138f are bent with respect to stem portions 138e so as to lie in a common cylindrical plane positioned concentrically within the general cylindrical plane of the clip.

As with clip 94, when male member 46 is introduced into female member 44, ramp 112 causes, together with the nose or tip of the male member, progressive elastic deflection of the clip finger portions 138d until the fingers 138d elastically snap back substantially to their original position with the end edges 138f of each finger engaging the trailing abutment annular shoulder 114. Also as with the clip 94, further introduction of the male member 46 into the female member 44 is prevented by ramp 112 engaging the frusto-conical surface 103 in the female member 44. With the connector members securely coupled, the end edges 138f of the finger portions 138d coact with the annular shoulder 114 to preclude accidental separation of the male and female members.

It will be understood that clips 94 and 138 are initially formed as a flat piece of thin spring steel, are thereafter processed by a multi-stage progressive die to form the various elements of the clip, and are thereafter rolled into a tubular or cylindrical configuration.

The invention will be seen to provide an improved retainer clip for use in a quick connect coupling and, specifically, will be seen to provide an inexpensive spring steel retainer clip providing a large circumferential area for engagement with a coacting surface on the male or female member so as to improve the retaining capacity of the clip.

Whereas preferred embodiments of the invention have been illustrated and described in detail, it will be apparent that various changes may be made in the disclosed embodiments without departing from the scope or spirit of the invention.

We claim:

1. A spring clip for use with a quick connect coupling to retain male and female members of the coupling in a coupled disposition, the clip comprising a relatively thin walled spring steel tubular member being compressed for fitting within an annular seat of the female member and allowed to expand elastically to its original diameter so as to be held resiliently within the bore, the clip including a first set of circumferentially spaced finger portions for engagement with trailing abutment means on the male member to inhibit withdrawal of the male member and further including a second set of circumferentially spaced finger portions adapted to engage an annular shoulder defining one end of the annular seat of the female member so as to preclude axial movement of the clip within the female member, characterized in that each finger portion of one of the sets of finger portions has a generally linear configuration, each finger portion of the other set of finger portions has a T configuration including a head extending circumferentially and a stem extending axially, and each stem has a circumferential width throughout its axial extent less than the circumferential extent of the associated head.

2. A clip according to claim 1 wherein the T-shaped finger portions define a circumferential surface for engagement with the annular shoulder of the female member.

3. A retainer according to claim 1 wherein the T-shaped finger portions define a circumferential surface for engagement with the trailing abutment means on the male member.

4. A quick connect coupling comprising a female member defining a passage defining an annular seat, a male member sized to fit in the passage of the female member and defining an abutment surface, and a spring clip positioned in the annular seat of the female member and comprising a thin walled spring steel tubular member being compressed for seating in the annular seat and including a first plurality of circumferentially spaced finger portions for engagement with the male member abutment surface and a second plurality of circumferentially spaced finger portions for engagement with an annular shoulder defining one end of the annular seat, characterized in that each finger portion of one of the sets of finger portions has a generally linear configuration, each finger portion of the other set of finger portions has a T configuration including a head extending circumferentially and a stem extending axially, and each stem has a circumferential width throughout its axial extent less than the circumferential extent of the associated head.

5. A coupling according to claim 4 wherein the T-shaped fingers comprise the first plurality of circumferentially spaced finger portions for engagement with the abutment surface on the male member.

6. A coupling according to claim 4 wherein the T-shaped fingers comprise the second plurality of circumferentially spaced finger portions for engagement with an annular shoulder defining one end of the annular seat.

* * * * *